Jan. 5, 1954   C. H. GILLESPIE   2,664,941
TRACTOR SEAT WITH CUSHIONED SUPPORT MEANS
Filed April 30, 1952
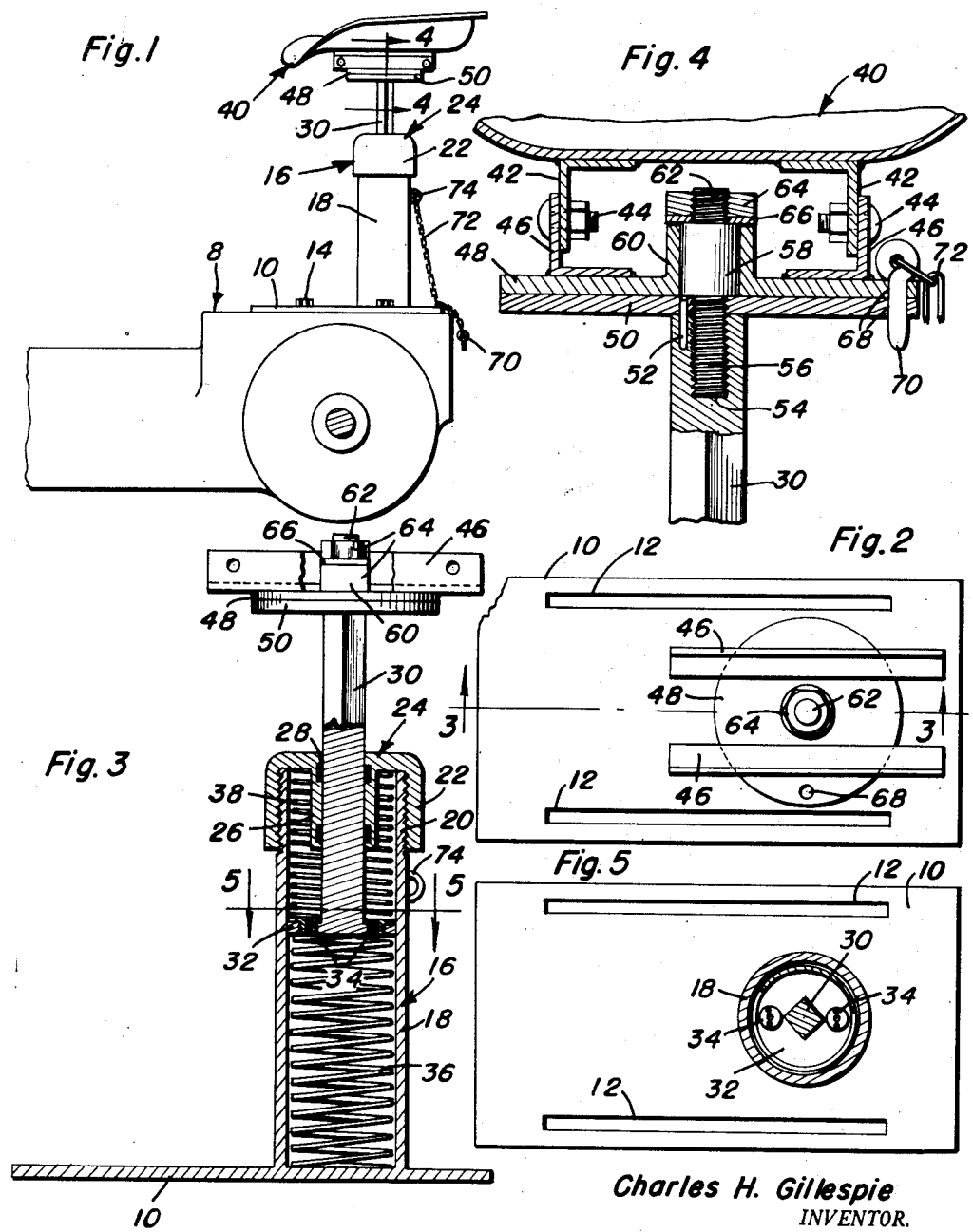
Charles H. Gillespie
INVENTOR.

Patented Jan. 5, 1954

2,664,941

UNITED STATES PATENT OFFICE 2,664,941

TRACTOR SEAT WITH CUSHIONED SUPPORT MEANS

Charles H. Gillespie, Cedar City, Utah

Application April 30, 1952, Serial No. 285,199

6 Claims. (Cl. 155—52)

1

The present invention relates to certain new and useful improvements in seat constructions, generally classified, but has more specific reference to a seat which is expressly adapted to be used on and in connection with tractors, farming machines and the like, one which is swivelly mounted and, what is more important, is characterized by complemental shock absorbing means.

A tractor seat having the specified functions and structural characteristics above mentioned is not, of course, new. As a matter of fact, such a construction is disclosed in Patent 2,526,552 granted to me on October 17, 1950. In the stated patent, a cushioning and shock absorbing stand is provided, the same being characterized by a cylinder having a base mounted on the machine, a relatively stiff coil spring confined in the lower half portion of the cylinder, a plunger including a head which is slidable in the cylinder and rests on the upper end of the spring, said plunger including a rod whose upper end is constructed to accommodate the detachable seat. A second coil spring is also arranged in the cylinder, located in the upper portion of the cylinder between the upper end of the cylinder and upper side of the plunger head. The plunger head is apertured and a supply of oil or heavy fluid is provided in the cylinder in order that the latter may function as a spring loaded dash-pot.

An object of the instant invention is to structurally, functionally and otherwise improve upon the aforementioned patent and similarly constructed prior art devices. With this in mind, the anchoring and adjusting base takes the form of a plate which, being slotted, may be adjustably anchored on the tractor or other equivalent support structure.

Another object has to do with a dash-pot wherein the barrel or cylinder has a screw cap, said screw cap being provided with a guide which is packed to cooperate with the plunger rod in order to provide a satisfactory stuffing box and prevent oil in the cylinder from leaking out between the plunger rod and said cap.

A further object has to do with light and heavy coil springs in the cylinder above and below the plunger head, said head having screw-threaded holes and said holes being provided with selectively usable bored fittings for regulating the surge of oil from one chamber to another in order to thus provide a dash-pot construction which is highly effective and practical in cushioning the up and down motions of the seat.

In addition, it is an object to provide the seat on its underside with a plate, to provide the upper end of the plunger rod with a plate, said plates being superimposed on one another, and means being provided for joining the plates with the plunger to thus provide a reliable swivel connection between the seat and the plunger rod.

Other objects, features and advantages will become more readily apparent from the following description and the accompanying sheet of illustrative drawings.

In the accompanying sheet of drawings wherein like numerals are employed to designate like parts throughout the same:

Figure 1 is a side elevational view of a tractor or equivalent vehicle having a seat structure constructed in accordance with the principles of the present invention.

Figure 2 is an enlarged top plan view with the seat omitted.

Figure 3 is a view in section and also in elevation taken on the plane of the line 3—3 of Figure 2, looking in the direction of the arrows.

Figure 4 is an enlarged view in section and elevation taken on the vertical line 4—4 of Figure 1, looking in the direction of the arrows.

Figure 5 is a horizontal section on the line 5—5 of Figure 3 looking in the direction of the arrows.

Referring first to Figure 1, the mobile support, which is generally a tractor or the like, but which may be, obviously, any conveyance or vehicle, is denoted by the numeral 6. The base which is adjustably and detachably mounted on the support is rectangular or the like, and is denoted by the numeral 10. It is superimposed upon the support and is provided with elongated slots 12 (see Figures 2 and 5) which serve to accommodate bolts 14, the latter securing the base detachably and adjustably on the support. The base serves to accommodate the dash-pot which, unitarily considered, is denoted by the numeral 16. This comprises a barrel or cylinder 18 which is joined to and rises from the base plate. The upper end of the cylinder is screw-threaded at 20 to accommodate the internally screw-threaded rim or flange 22 of the screw cap 24. The screw cap is provided with a central depending guide neck 26 having packing rings 28. This arrangement provides a satisfactory stuffing box for the reciprocal plunger rod 30. The latter and guide are polygonal in cross-section so that the rod slides freely but is non-rotatable in respect to the cylinder. The head of the plunger is a circular plate 32 which fits slidably and snugly in the bore of the cylinder.

Screw-threaded holes are provided in the plunger head and are provided with insertable and removable screw plugs 34 which constitute regulating fittings. There is a coil spring 36 in the lower chamber below the plunger head and a similar lighter weight coil spring 38 in the upper chamber. The head 32 rests against the coil spring 36 and the coil spring 38 rests against the head at one end and also against the screw cap 24 at the other end and it surrounds both the plunger rod and the stuffing box in the manner shown. In practice, the chambers are adapted to be filled with lubricating oil and this moves from one chamber to the other by way of the ports in the screw plugs 34 in a well known manner. The operation of the dash-pot is of course well known but in this arrangement the adjustable screw plugs 34 and the associated and complemental springs are thought to provide a more satisfactory operating dash-pot.

The tractor or equivalent seat is denoted by the numeral 40 and this is of appropriate shape. It is provided on its underside with a pair of spaced parallel angle irons 42—42 which are separably bolted as at 44—44 to a pair of complemental angle irons 46—46. The latter are spot welded or otherwise rigidly mounted atop an upper discoidal plate 48 which latter is superimposed on a companion plate 50 mounted atop the plunger rod 30. More specifically, the plunger rod has an axial screw-threaded socket 54 to accommodate a screw-threaded stud 56 which is provided with an enlarged smooth surfaced portion 58 providing a journal. This journal serves to accommodate a collar 60 on the top plate 48 and there is a reduced screw-threaded upper end 62 on the stud to accommodate a nut 64 and washer 66 to thus provide a separable connection between the collar 60 and screw threaded upper end 62. This same means serves to clampingly bind the plate 48 against the underlying plate 50. The latter plate is provided with a central screw threaded hole threaded on stud 56 and clamped between journal 58 and the rod 30 and an off-center dowel pin 52 is utilized, as shown, to prevent rotation of the plate 50 relative to the rod 30.

Both plates are provided with alignable keeper holes 68 to accommodate an insertable and removable lock pin 70 carried by a chain 72. The chain is anchored on an eye 74 carried by the cylinder 18. Therefore, it is possible to either lock the seat against rotation or to unlock it so that it will swivel freely. In addition to swivelling it has free up and down floating by reason of the novel dash-pot and shock absorbing means provided therein.

Minor changes in shape, size, materials and rearrangement of parts may be resorted to in actual practice provided no departure is made from the invention as claimed.

Having described the invention, what is claimed as new is:

1. In a seat construction of the class described, a base, a cylinder attached to and rising from said base, a screw cap mounted on the upper end of said cylinder, said screw cap having a central guide, said guide being non-circular in cross-section and being provided with packing rings, a plunger having a rod and a head, said head being slidable in said cylinder and said rod being slidable in said guide and corresponding in cross-section with the guide, said head being provided with apertures, and insertable and removable bored screw plugs fitted into said apertures.

2. In a seat construction of the class described, a base, a cylinder attached to and rising from said base, a screw cap mounted on the upper end of said cylinder, said screw cap having a central guide, said guide being non-circular in cross-section and being provided with packing rings, a plunger having a rod and a head, said head being slidable in said cylinder and said rod being slidable in said guide and corresponding in cross-section with the guide, said head being provided with apertures, and insertable and removable bored screw plugs fitted into said apertures, a coil spring in the lower portion of said cylinder between the plunger head and bottom of the cylinder, a second coil spring in the upper portion of the cylinder above the head and surrounding the rod and guide.

3. In a seat construction of the class described, a base, a cylinder attached to and rising from said base, a screw cap mounted on the upper end of said cylinder, said screw cap having a central guide, said guide being non-circular in cross-section and being provided with packing rings, a plunger having a rod and a head, said head being slidable in said cylinder and said rod being slidable in said guide and corresponding in cross-section with the guide, said head being provided with apertures, and insertable and removable bored screw plugs fitted into said apertures, a coil spring in the lower portion of said cylinder between the plunger head and bottom of the cylinder, a second coil spring in the upper portion of the cylinder above the head and surrounding the rod and guide, superimposed swivelly mounted plates mounted atop the plunger rod, and seat means separably mounted on said plates.

4. A seat construction for use on a tractor, farm machines generally, and wherever else practical; in combination, an anchoring base, a dash-pot embodying a cylinder secured to said base and a plunger reciprocable in said cylinder, said plunger embodying a rod, means on said cylinder guiding said rod against rotation relative to the cylinder, a seat, means swivelly mounting said seat on said rod, said last named means embodying a plate fixed on said rod, a second plate superimposed on said first plate, and means affording a connection between said seat and second plate, said last named means comprising a pair of angle irons secured on said second plate, and complemental pair of angle irons secured to said seat, the respective pairs of angle irons being separately bolted together.

5. A seat construction for use on a tractor, farm machines generally, and wherever else practical; in combination, an anchoring base, a dash-pot embodying a cylinder secured to said base and a plunger reciprocable in said cylinder, said plunger embodying a rod, means on said cylinder guiding said rod against rotation relative to the cylinder, a seat, means swivelly mounting said seat on said rod, said rod being provided in its upper end with an axial screw threaded socket, a centrally apertured plate resting atop said rod with its aperture in registry with said socket, a stud having a screw threaded portion passing through the aperture in said plate and screwed into said socket and holding the plate removably on the rod, the upper end of the stud being enlarged and providing a journal and being then reduced and providing a stud portion, said means swivelly mounting said seat comprising a second plate mounted atop said first plate and provided with a collar to swivel on said journal, a nut screwed on said stud portion and engaging said collar, and means affording a connection between said seat and second plate.

6. In a seat construction, a base adapted to be detachably and adjustably mounted on a relatively stationary support, a cylinder attached to and rising from said base, a screw cap mounted on the upper end of said cylinder, said screw cap having a central guide and said guide being non-circular in cross-section, a plunger having a rod and a head, said head being slidable in said cylinder and said rod being slidable but not rotatable in said guide and having a cross-section corresponding to the cross section of the guide, a first plate mounted atop said rod, a second plate superimposed on said first plate, means separably and swively joining said second plate to said first plate, said plates having registerable keeper holes, a keeper pin normally fitting in said holes and locking said plates solidly together and against relative rotation, a seat arranged above said plate, and means separably joining said seat to said second plate.

CHARLES H. GILLESPIE.

References Cited in the file of this patent

UNITED STATES PATENTS

| Number | Name | Date |
| --- | --- | --- |
| 1,337,059 | Fisher | Apr. 13, 1920 |
| 1,445,516 | Jones | Feb. 13, 1923 |
| 1,629,939 | Turner | May 24, 1927 |
| 1,685,770 | Bowen | Oct. 2, 1928 |
| 2,092,669 | Greve | Sept. 7, 1937 |
| 2,526,552 | Gillespie | Oct. 17, 1950 |